US008166031B2

(12) United States Patent  
Zabawskyj et al.

(10) Patent No.: US 8,166,031 B2
(45) Date of Patent: Apr. 24, 2012

(54) SYSTEM AND METHOD FOR PROVIDING CONTEXT BASED SERVICES

(75) Inventors: Bohdan Konstantyn Zabawskyj, Woodbridge (CA); Al-Amyn Samji, Markham (CA); Vinay Kumar, Brampton (CA); Vincent Chi Chiu Wong, Mississauga (CA)

(73) Assignee: Redknee Inc., Mississauga, Ontario (CA)

( * ) Notice: Subject to any disclaimer, the term of this patent is extended or adjusted under 35 U.S.C. 154(b) by 276 days.

(21) Appl. No.: 11/744,568

(22) Filed: May 4, 2007

(65) Prior Publication Data

US 2008/0275839 A1 Nov. 6, 2008

(51) Int. Cl.
 *G06F 7/00* (2006.01)
 *G06F 17/30* (2006.01)
(52) U.S. Cl. ........................................................ 707/736
(58) Field of Classification Search .............. 707/5, 722, 707/736; 342/357.06
 See application file for complete search history.

(56) References Cited

U.S. PATENT DOCUMENTS

| | | | | |
|---|---|---|---|---|
| 5,261,080 | A * | 11/1993 | Khoyi et al. | 710/65 |
| 6,297,766 | B1 * | 10/2001 | Koeller | 342/357.06 |
| 6,725,303 | B1 * | 4/2004 | Hoguta et al. | 710/106 |
| 6,782,307 | B2 * | 8/2004 | Wilmott et al. | 700/233 |
| 6,895,238 | B2 * | 5/2005 | Newell et al. | 455/414.2 |
| 7,003,284 | B2 | 2/2006 | Schwartz et al. | |
| 7,039,424 | B2 | 5/2006 | Gorsuch | |
| 7,359,714 | B2 * | 4/2008 | Parupudi et al. | 455/456.1 |
| 7,747,264 | B2 * | 6/2010 | Fiorini | 455/466 |
| 2004/0002988 | A1 | 1/2004 | Seshadri et al. | |
| 2005/0071757 | A1 | 3/2005 | Ehrich et al. | |
| 2005/0129018 | A1 | 6/2005 | Casaccia et al. | |
| 2006/0277098 | A1 | 12/2006 | Chung et al. | |
| 2007/0088801 | A1 | 4/2007 | Levkovitz | |
| 2007/0094691 | A1 | 4/2007 | Gazdzinski | |

FOREIGN PATENT DOCUMENTS

WO 2006/020834 A1 2/2006

OTHER PUBLICATIONS

International Search Report for International Patent Application PCT/CA2008/000816.
Written Opinion of the International Searching Authority for International Patent Application PCT/CA2008/000816.
International Application No. PCT/CA2008/000816; Written Opinion of the International Preliminary Examining Authority dated May 15, 2009.
Delvic A. et al.: "Location-aware information services using user profile matching" Jun. 15, 2005, Telecommunications, 2005. Contel 2005. Proceedings of the 8th International Conference on Zagreb, Croatia Jun. 15-17, 2005, Piscataway, NJ, USA,IEEE, pp. 327-334, XP010810329, ISBN: 9789531840811.
European Patent Application No. 08748218.8 Search Report dated Apr. 19, 2010.

* cited by examiner

*Primary Examiner* — Greta Robinson
*Assistant Examiner* — Jeffrey Chang
(74) *Attorney, Agent, or Firm* — Perry+Currier Inc.; Kristjan Spence; T. Andrew Currier

(57) ABSTRACT

In one aspect of the disclosure, a method of delivering content to a portable electronic device is provided that comprises receiving a request for content; determining a subscription level for a subscriber of the portable electronic device; determining, based on the subscription level, whether to deliver supplementary content with the content; and, if delivery of the supplementary content is to be effected then determining a method of delivery of the content; determining a method of delivery of the supplementary content; determining the supplementary content; and delivering the content and the supplementary content.

29 Claims, 4 Drawing Sheets

SYSTEM AND METHOD FOR PROVIDING CONTEXT BASED SERVICES

FIELD OF THE INVENTION

The present specification relates generally to telecommunications and more particularly relates to a system and method for providing mobile services.

BACKGROUND OF THE INVENTION

Computing technology and networking technology have combined to produce extremely powerful means for telecommunication. However, further advances are to be expected and welcomed.

Portable electronic devices are now commonplace and increasing in sophistication and function. Portable electronic devices frequently combine the functionality of traditional cellular telephones, wireless personal digital assistants, hand-held computers, wireless paging devices, media players, cameras and the like.

With the increased functionality of portable electronic devices, so too comes an increase in the demand for wireless services. Indeed, the array of present wireless service offerings is impressive, and yet is probably only a small percentage of the full suite of wireless services to come. Indeed, in addition to traditional voice services, portable electronic devices can now also handle a wide variety of data services, including email, mapping, streaming audio, streaming video, chat. Creative service providers will no doubt, develop new services that exploit the impressive capabilities of portable electronic devices.

Problems exist, however, with new services. One problem is educating subscribers about the availability of such services. Another problem is educating subscribers how to actually use the services. Another problem is devising a compensation model that is appealing to subscribers which generates sufficient revenue to cover the costs of the services. Another problem is modifying the compensation model as a function of the subscriber's preferences as well as changes in the subscriber's context. Other problems also exist.

SUMMARY OF THE INVENTION

An aspect of this specification provides a method of delivering content to a portable electronic device comprising:
Determining that content is to be delivered to the portable electronic device;
determining a subscription level for a subscriber of the portable electronic device;
determining, based on the subscription level, whether to deliver supplementary content with the content; and, if delivery of the supplementary content is to be effected then:
determining a method of delivery of the content;
determining a method of delivery of the supplementary content;
determining the supplementary content;
delivering the content and the supplementary content.

[new] The determination as to whether content is to be delivered to the portable device can be invoked via a request from the portable electronic device;

[new] The determination as to whether content is to be delivered to the portable device can be determined by algorithmic means per the subscriber's profile and upon the attainment of various criteria including time and contextual attributes such as location and presence, or based on the subscriber's state in a given promotion or loyalty program.

The content and supplementary content can consist of various media as well as a combination of various media, including but not limited to, video-streams, music-streams, pictures, applications, files, and text-messages.

The subscription level can include an indication of whether the subscriber is to receive the supplementary content.

The indication of whether the subscriber is to receive the supplementary content can be set by the subscriber, the network operator, and/or via algorithmic means.

Where the subscription level does not indicate whether the subscriber has elected to receive the supplementary content, then the method can include sending a query to the portable electronic device querying whether the subscriber wishes to receive the supplementary content.

The subscription level can include an indication of whether the subscriber has elected to receive the supplementary content per a given set of contextual attributes.

The set of contextual attributes can include the nature of the electronic device being utilized by the subscriber, the location of the subscriber, whether the subscriber is roaming, their proximity to vendors of services or products, and/or the attributes of the available communications links to the subscriber's portable electronic device.

The method of delivery of the content can be based on one or more of: display characteristics of the portable electronic device; a location of the portable electronic device; available bandwidth of one or more communications links connecting one or more base stations to the portable electronic device; the preferences of the subscriber; and/or the class of service attributed to the subscriber by the network operator, and/or the subscriber's state in a given promotion or loyalty program.

The method of delivery of the supplementary content can include one or more of various media as well as a combination of various media, including but not limited to, video-streams, music-streams, pictures, banners, applications, files, and text-messages.

During the delivery, the method can include effecting a change in the portable electronic device to another electronic device such that the delivery continues on the another electronic device.

During the delivery, the method can include effecting a change based on contextual attributes including the location of the subscriber, whether the subscriber is roaming, their proximity to vendors of services or products, and/or the attributes of the available communications links to the subscriber's portable electronic device.

During the delivery, the method can include effecting a change in the supplementary content.

During the delivery, the method can include effecting a change in the content.

During the delivery, the method can include effecting a change in the compensation model.

During the delivery, the method can include temporarily pausing the delivering in response to a request from the portable electronic device.

During the delivery, the method can include temporarily pausing the delivering in response a change in one or more contextual attributes including the nature of the electronic device being utilized by the subscriber, the location of the subscriber, whether the subscriber is roaming, their proximity to vendors of services or products, or the attributes of the available communications links to the subscriber's portable electronic device.

The method can include banking rewards or credits on a subscriber account associated with the subscriber corresponding to a level of supplementary content received by the subscriber.

The method can include modifying the compensation model associated with the delivery of content to the subscriber corresponding to a level of supplementary content received by the subscriber.

Another aspect of this specification provides a carrier administrator server comprising an interface interconnecting an electronic device, a content server and at least one additional content server. The processing unit is connected to the interface and is configured for receiving a request for content to be delivered to the portable electronic device. The processing unit is further configured to determine a subscription level for a subscriber of the portable electronic device. The processing unit is further configured to determine, based on the subscription level, subscriber preferences, and contextual attributes, whether to deliver supplementary content with the content; and, if delivery of the supplementary content is to be effected then:

determining a method of delivery of the content;
determining a method of delivery of the supplementary content;
determining the supplementary content;
delivering the content and the supplementary content;
determining a compensation model for the delivery of the content.

Other aspects of this specification includes a portable electronic device, a system, and a computer readable medium implemented using the teachings herein.

DETAILED DESCRIPTION OF THE EMBODIMENTS

Figure 1:
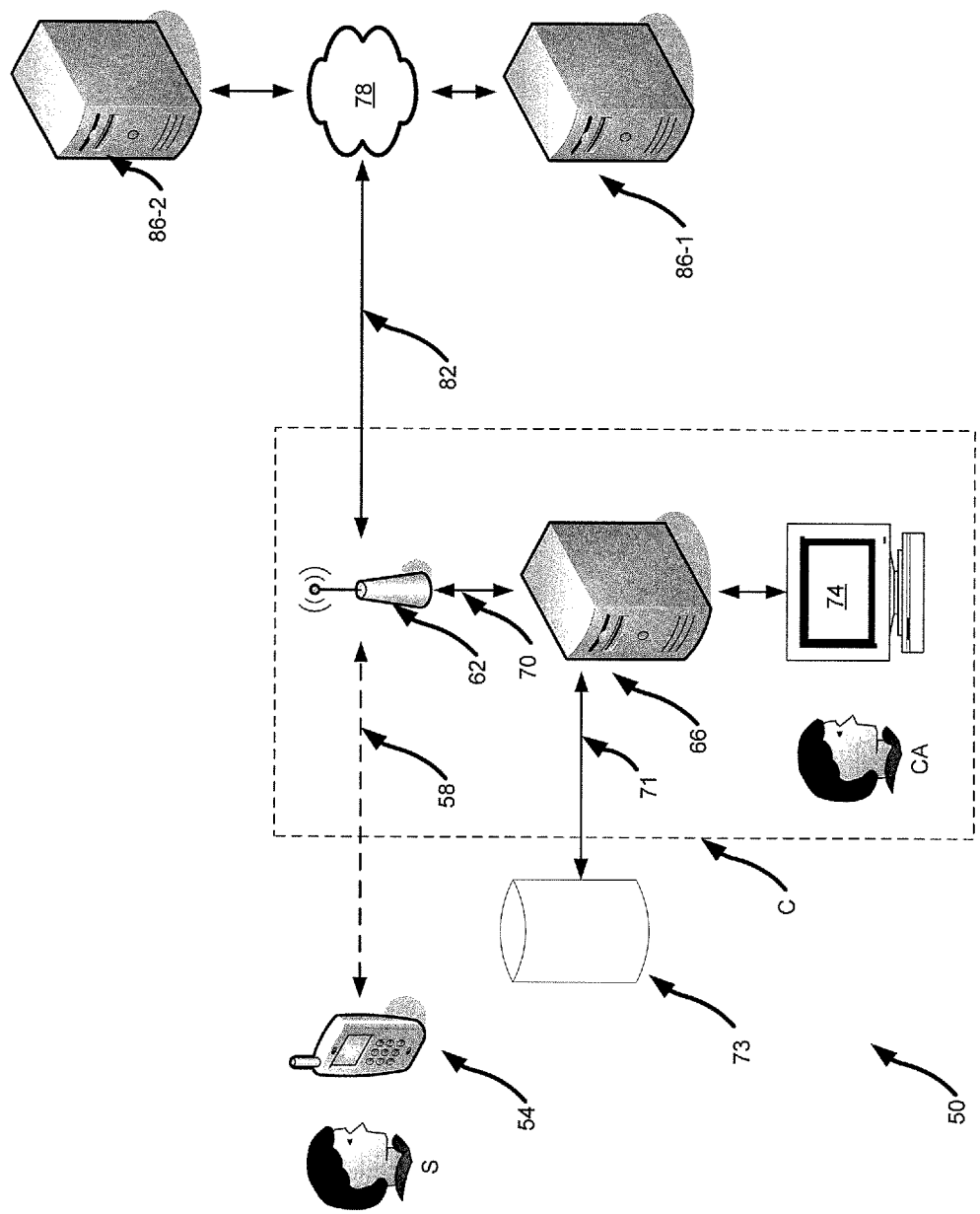
FIG. 1 shows a schematic representation of a system for providing mobile services.

Referring now to FIG. 1, a system for providing mobile services is indicated generally at 50. System 50 comprises at least one portable electronic device ("PED") 54 that is operated by a subscriber S. PED 54 has a wireless interface and is therefore able to communicate via a wireless link 58. Link 58 can be based on any known type of wireless access link, or combinations thereof, including, by way of non-limiting example, Code Division Multiple Access ("CDMA"), the Global System for Mobile communications ("GSM"), WiMax, 802.11g and its variants, Bluetooth and the like. While link 58 is wireless in a present embodiment, in other embodiments link 58 can be wired. Indeed, the set of links interconnecting the various components need not be particularly limited.

At the end of link 58 opposite to PED 54 is a wireless base station 62 that is operated by a carrier C. Carrier C also operates at least one carrier administrative server 66 that connects to base station 62 via a backhaul 70. A terminal 74 is connected to server 66 in order to allow a carrier administrator CA to interact with server 66. Carrier C is typically the carrier with whom subscriber S directly contracts for wireless services, as opposed to a roaming carrier that has infrastructure that subscriber S can utilize due to a relationship between carrier C and that roaming carrier. However, it is contemplated that PED 54 can access server 66 via a roaming carrier (not shown), in which case link 58 can be abstracted to include all of the infrastructure of one or more roaming carriers.

Base station 62 is also connected to a network 78, such as the Internet, via a backhaul 82. In turn, a plurality of content servers 86-1 and 86-2 are connected to network 78. In a present embodiment, only two content servers 86 are shown, but in other embodiments more content servers can be provided. Each content server 86 can provide any type of content or service that subscriber S may wish to access fro PED 54. Such content or service can include, for example, streaming video, streaming audio, text, files, applications, pictures, graphics or any combination thereof.

For the present description, content server 86-1 will be referred to as primary content server 86-1 while content server 86-2 will be referred to as secondary content server 86-2.

Carrier administrative server 66 is configured to perform a variety of device management and administrative functions on behalf of carrier C in relation to PED 54. At least one of those administrative functions includes the management of service subscriptions, including aspects of subscriptions relating to content requests, by PED 54. More specifically, carrier administrator CA using terminal 74 can interact with server 66, to view, modify, and otherwise manipulate service subscriptions that are associated with subscriber S and, more specifically, the ability and/or rights and/or means to access content from at least one of the content servers 86. Sever 66 is also configured to access a subscriber profile database 73 via an applicable application program interface (API) 71. While database 73 is shown outside of the domain of carrier C in FIG. 1, it is also contemplated that database 73 can be within the domain of carrier C as well.

Figure 2:
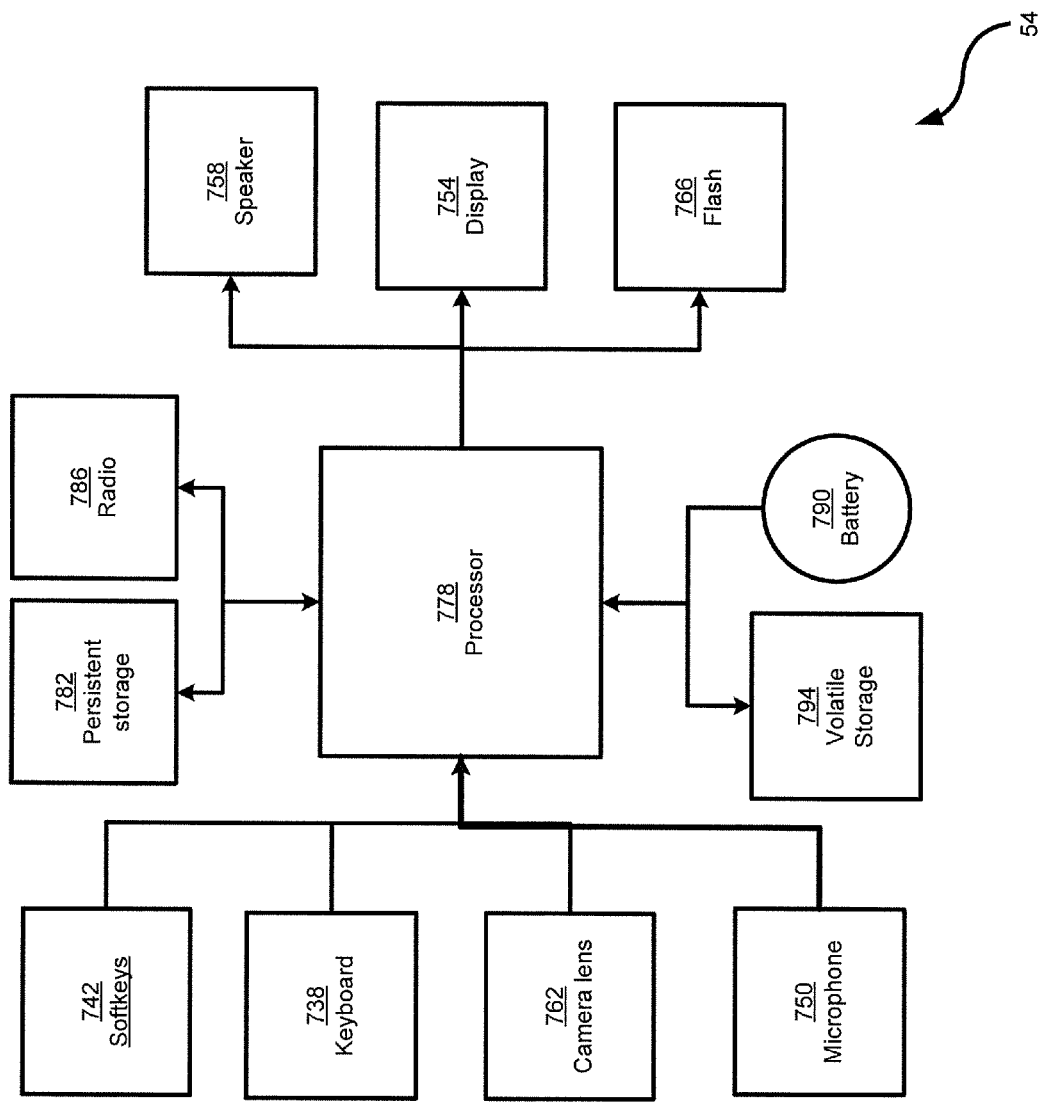
FIG. 2 shows a schematic representation of the portable electronic device of FIG. 1.

It should be understood that the structure and features of PED 54 can vary. However, to provide a clear example, FIG. 2 shows a block diagram representing exemplary components of PED 54 is shown. PED 54 thus includes a processor 778 which interconnects input devices of PED 54 (e.g. soft keys 742, keyboard 738, a camera lens 762 and a microphone 750) and output devices of PED 54 (e.g. a speaker 758, a display 754 and a camera flash 766). Processor 778 is also connected to a persistent storage device 782. As discussed earlier, persistent storage device 782 can be implemented using flash memory or the like, and/or can include other programmable read only memory ("PROM") technology and/or can include read only memory ("ROM") technology and/or can include a removable "smart card" and/or can comprised combinations of the foregoing. Collectively, one can view processor 778 and persistent storage device 782 and as a microcomputer.

PED 754 also includes a wireless radio 786 that connects wirelessly PED 54 to base station 62 to provide wireless services and content to PED 54. PED 54 also includes a battery 790 which is typically rechargeable and provides power to the components of PED 54. In FIG. 2, for simplicity battery 90 is only shown connected to processor 78, but it will be understood that battery 790 is connected to any component (e.g. the CCD associated lens 762, radio 788, display 754 and flash 766) within PED 54 that needs power to operate. PED 54 also includes volatile storage 794, which can be implemented as random access memory ("RAM"), which can be used to temporarily store applications and data as they are being used by processor 778.

Figure 3:
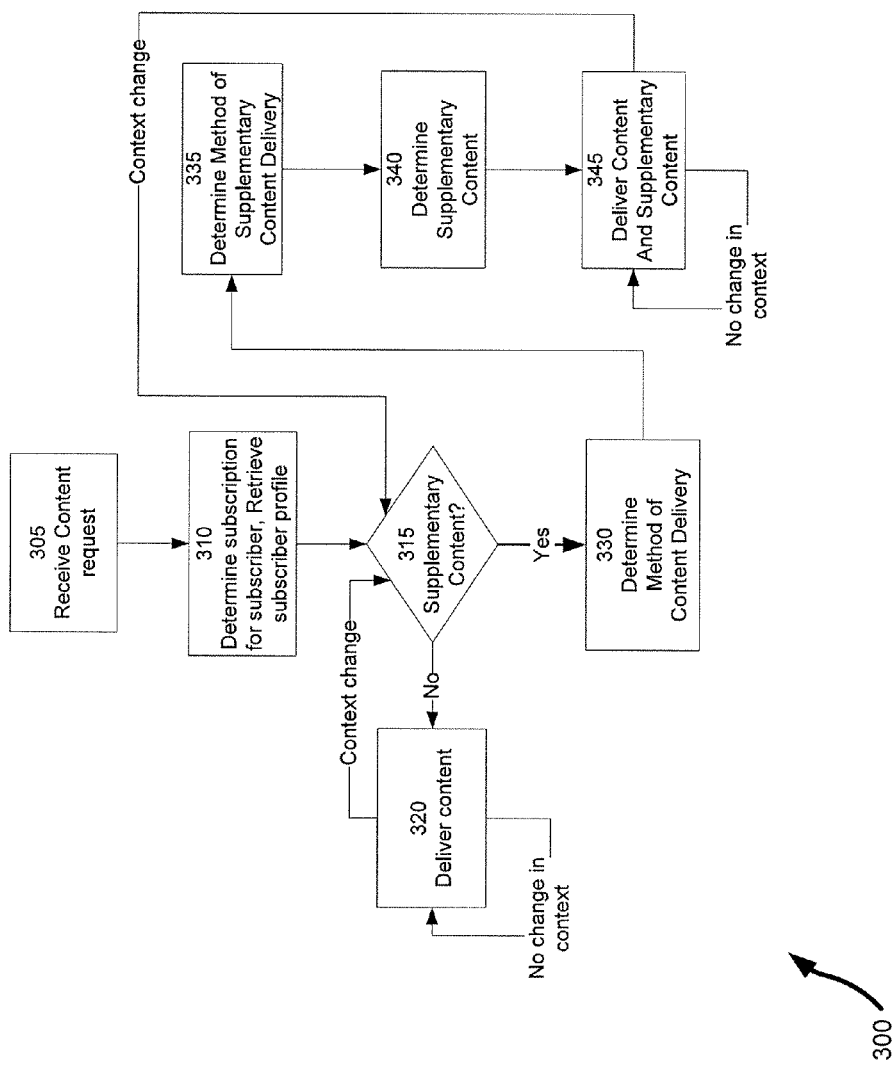
FIG. 3 shows a flowchart depicting a method of providing mobile services.

Referring now to FIG. 3, a method for providing mobile services is depicted in the form of a flowchart and indicated generally at 300. For the purposes of assisting in further understanding of system 50 and method 300, it will be assumed that method 300 is performed using system 50. However, it should be understood that system 50 and/or method 300 can be varied, and need not be performed in conjunction with each other.

Beginning first at step 305, a request for content is determined. Step 305 can be responsive to subscriber S using PED 54 to enter a request for some form of content—for example, content that is available on server 86-1. The request entered by subscriber S can be received at server 66 which will ultimately perform step 305. Step 305 can also be responsive to the server 66 or server 86-1 determining by algorithmic means that content is to be delivered to subscriber S via PED 54 per the subscriber's preferences and upon the attainment of various criteria including time and contextual attributes such as location and presence.

Next, at step 310, the subscription package for the subscriber issuing the request at step 305 is determined and the subscriber's preferences are retrieved. Step 310 is performed by server 66, which examines its records to ascertain the nature of the subscriber S's subscription and to retrieve the subscriber S's preferences from the subscriber's profile database 73.

Next, at step 315, a determination is made as to whether supplementary content should be delivered along with the content specifically determined at step 305. The determination made at step 315 is based on the subscription package for subscriber S as determined at step 310 in conjunction with the subscriber preferences as retrieved as step 310 as well as a set of contextual attributes that may include the nature of the electronic device being utilized by the subscriber, the location of the subscriber, whether the subscriber is roaming, their proximity to vendors of services or products, or the attributes of the available communications links to the subscriber's portable electronic device. Put in other words, in certain circumstances the determination step at 315 will indicate that supplementary content should be delivered, whereas in other circumstances supplementary content should not be delivered.

If the determination at step 315 is "no", that supplementary content should not be delivered, then method 300 advances from step 315 to step 320 at which point the content requested at step 305 is delivered. Thus, at step 320, server 66 will communicate with content server 86-1 that supplementary content should not be delivered, and the content on server 86-1 will be delivered to PED 54. Those skilled in the art will now recognize that content may be stored on more than one server and that the server may communicate with more than one context server in order to effect delivery of the applicable content.

At step 320, content will continue to be delivered subject to a change in the delivery mechanism or context until the subscriber S terminates the request for delivery of content or the content delivery from server 86-1 is otherwise completed. Changes in the delivery mechanism and context can include a change in the subscriber's device, a change in the nature of the communication links to the subscriber's PED, a change in the subscriber's location, the subscriber entering a roaming state via another network.

At step 320, if a change in the delivery mechanism or context is determined, then the delivery of content can be suspended and the method will proceed to step 315 in order to determine whether supplementary content should be delivered. Whether the content is suspended will be determined by the server 66 based on a variety of factors including, for example: a) the capabilities of PED 54, b) the nature of the available communications links, c) any user preferences for delivery of supplementary content, d) any service levels associated with the subscription for subscriber S, e) other contextual attributes such as the location of the subscriber, the roaming state of the subscriber, or the subscriber's proximity to vendors of services or products, and/or e) other attributes such as subscriber's demographic information, the time, and/or date.

Those skilled in the art will now recognize that the foregoing description of steps 305, 310, 315 and 320 can reflect traditional content requests—such as requests for streaming audio—i.e. music and the like, streaming video—i.e. movies and the like, the delivery of files—i.e. pictures, music files, movies and the like, and applications i.e. games, and utilities and the like.

If, however, a determination is made at step 315 is "yes", that supplementary content should be delivered, then method 300 advances from step 315 to step 330.

At step 330, which is typically performed by server 66, the method of content delivery is determined for the content that was requested from server 86-1. This determination is based on a variety of factors, including for example: a) the capabilities of PED 54, b) the nature of the available communications links, c) any user preferences for delivery of content, d) any service levels associated with the subscription for subscriber S, e) other contextual attributes such as the location of the subscriber, the roaming state of the subscriber, or the subscriber's proximity to vendors of services or products, and/or f) other attributes such as the time and date.

Factors associated with the capabilities of PED 54 can include, for example, buffer sizes, the screen resolution and any video codecs that are specific to PED 54, as in the case of a streaming video content requested from server 86-1. User preferences for content delivery can include, for example, in the case of streaming video, film genres, language preferences, the presence of sub-titles. Service levels for content delivery can include, for example, in the case of streaming video, the resolution of the picture and the quality of the sound that may be associated with given video or audio codecs. Generic service levels can include the quality of service levels as determined by the maximum bandwidth and latency for subscriber. It should be reemphasized, however, that these are all examples and other factors can also be used to determine the method of content delivery in addition to, or in lieu of, the specific examples given.

At step 335, which is typically performed by server 66, the method for delivery of supplementary content is determined for the supplementary content that is to be delivered with the content from server 86-1. Those skilled in the art will now recognize that content as well as supplementary content can be stored on more than one server and that the content and supplementary content need not be stored on the same server or servers as the case may be. This determination is also based on a variety of factors including, for example: a) the capabilities of PED 54, b) the nature of the available communications links, c) any user preferences for delivery of supplementary content, d) any service levels associated with the subscription for subscriber S, e) other contextual attributes such as the location of the subscriber, the roaming state of the subscriber, or the subscriber's proximity to vendors of services or products, and/or e) other attributes such as subscriber's demographic information, the time, and/or date.

Next, at step 340, a determination is made as to the actual supplementary content that will be delivered in accordance with the determinations made at step 330 and 335. This determination can also be made based on the nature of the subscription determined at step 310 as well as the subscriber's profile retrieved at step 310, and it can also be chosen to complement, if desired, the content that was requested from server 86-1. In the present example, it can be determined that the supplementary content will be obtained from server 86-2.

Next, at step 345, the content from server 86-1 as determined at step 305, and the supplementary content from server 86-2 as determined at step 340, are delivered to PED 54 in accordance with the determinations made at step 330 and step 335. At step 345, content and supplementary content will continue to be delivered subject to a change in the delivery mechanism or context until the subscriber S terminates the request for delivery of content or the content delivery is otherwise completed. Changes in the delivery mechanism and context can include a change in the subscriber's device, a change in the nature of the communication links to the subscriber's PED, a change in the subscriber's location, the subscriber entering a roaming state via another network.

At step 345, if a change in the delivery mechanism or context is determined, then the delivery of content or supplementary content may be suspended and the method will proceed to step 315 in order to determine whether supplementary content should be delivered. Whether the content or supplementary content is suspended will be determined by the server 66 based on a variety of factors including, for example: a) the capabilities of PED 54, b) the nature of the available communications links, c) any user preferences for delivery of supplementary content, d) any service levels associated with the subscription for subscriber S, e) other contextual attributes such as the location of the subscriber, the roaming state of the subscriber, or the subscriber's proximity to vendors of services or products, and/or e) other attributes such as subscriber's demographic information, the time, and/or date.

Having provided a general discussion regarding method 300, it is useful to also discuss some specific implementations that can be effected using method 300. For example, assume that subscriber S uses PED 54 at step 305 to request to view a movie stored on server 86-1. Assume also that subscriber S has selected a service plan from carrier C that does not include permissions for subscriber S to view movies via link 58, as part of the "air-time" package purchased by subscriber S from carrier C. Thus, the determination made at step 310, in this example, is that subscriber S is not permitted to view the movie stored on server 86-1. As a minor variation to method 300, at this point subscriber S could be queried via PED 54 as to whether subscriber S wishes to change its service plan to include permissions to view movies via link 58, and to pay appropriate premiums for such changes; or subscriber S can be asked if subscriber S would be willing to receive supplementary content, in addition to the requested content, in exchange for being permitted to view the movie on server 86-1 without payment of additional fees or changes to the subscriber's subscription. Assuming, in this variation, that subscriber S selects the latter option (i.e. to receive supplementary content), then at step 315 it would be determined that "yes" supplementary content is to be delivered.

Thus, at step 330 the determination is made as to the method of content delivery. Step 330 is performed as previously described, with again attention being paid to content delivery factors that are specific to PED 54 and the nature of the content requested at step 305. Step 335 is likewise performed substantially as previously described. More specifically, it can be determined at step 335 as to whether supplementary content, which in this case could be advertising that would generate revenue for carrier C to supplement and/or pay for the licensing fees for accessing the movie stored on server 86-1. Step 335 can thus also include a determination as to what form such content delivery would take; by way of non-limiting examples: a streaming banner running across a portion of the display 754 of PED 54, or full video commercials that are spliced into appropriate points of the movie that is being delivered from server 86-1.

It is also contemplated that the frequency and/or quantity of supplementary material that is presented in the form of advertising, can also be variable based on the subscription for subscriber S. That is today, subscriber S can elect to subscriptions from carrier C that include increasing fees in exchange for decreasing levels of delivery of supplementary material, with the highest fee level offering no delivery of supplementary material whatsoever.

At step 340, the actual supplementary content that is to be delivered is determined. The supplementary content can be complementary to the material requested from server 86-1 and/or the demographics and/or other factors as previously discussed. For example, assuming that subscriber S is a twenty-five year old man who has elected to watch the film "2 Fast 2 Furious" on server 86-1, then the supplementary material from server 86-2 can be chosen to be advertisements relating to automobiles. However, as a further variation, the content selected at step 340 can be further varied by any privacy settings mandated by subscriber S or by local laws, such that, for example, the age and gender of subscriber S can be suppressed from the criteria used to select content from server 86-2.

At step 345, the content and the supplementary content are delivered in the manner previously discussed.

Other examples of specific implementations that can be effected using method 300, other than the above, are contemplated. For example, assume that subscriber S uses PED 54 at step 305 to request to view a map of the city of Los Angeles stored on server 86-1. Assume also that subscriber S has selected a service plan from carrier C that includes a request to automatically provide adjunct content in request to any content requested via server 66, as part of the "air-time" package acquired by subscriber S from carrier C. Thus, the determination made at step 310, in this example, is "Yes", subscriber S is to receive supplementary content for such map requests.

Thus, at step 330 the determination is made as to the method of content delivery. Step 330 is performed as previously described, with again attention being paid to content delivery factors that are specific to PED 54 and the nature of the content requested at step 305. Step 335 is likewise performed substantially as previously described. More specifically, it can be determined at step 335 as to whether supplementary content, which in this case could be weather for the City of Los Angeles. Step 335 can also include a determination as to what form such content delivery would take; by way of non-limiting examples: a streaming banner running across the top, bottom or side of display 754 of PED 54.

At step 340, the actual supplementary content that is to be delivered is determined. The supplementary content, in this example, can be a request from server 86-2 for local weather conditions in Los Angeles, while server 86-1 contains the actual mapping information requested at step 305. At step 345, the content and the supplementary content are delivered in the manner previously discussed.

Figure 4:
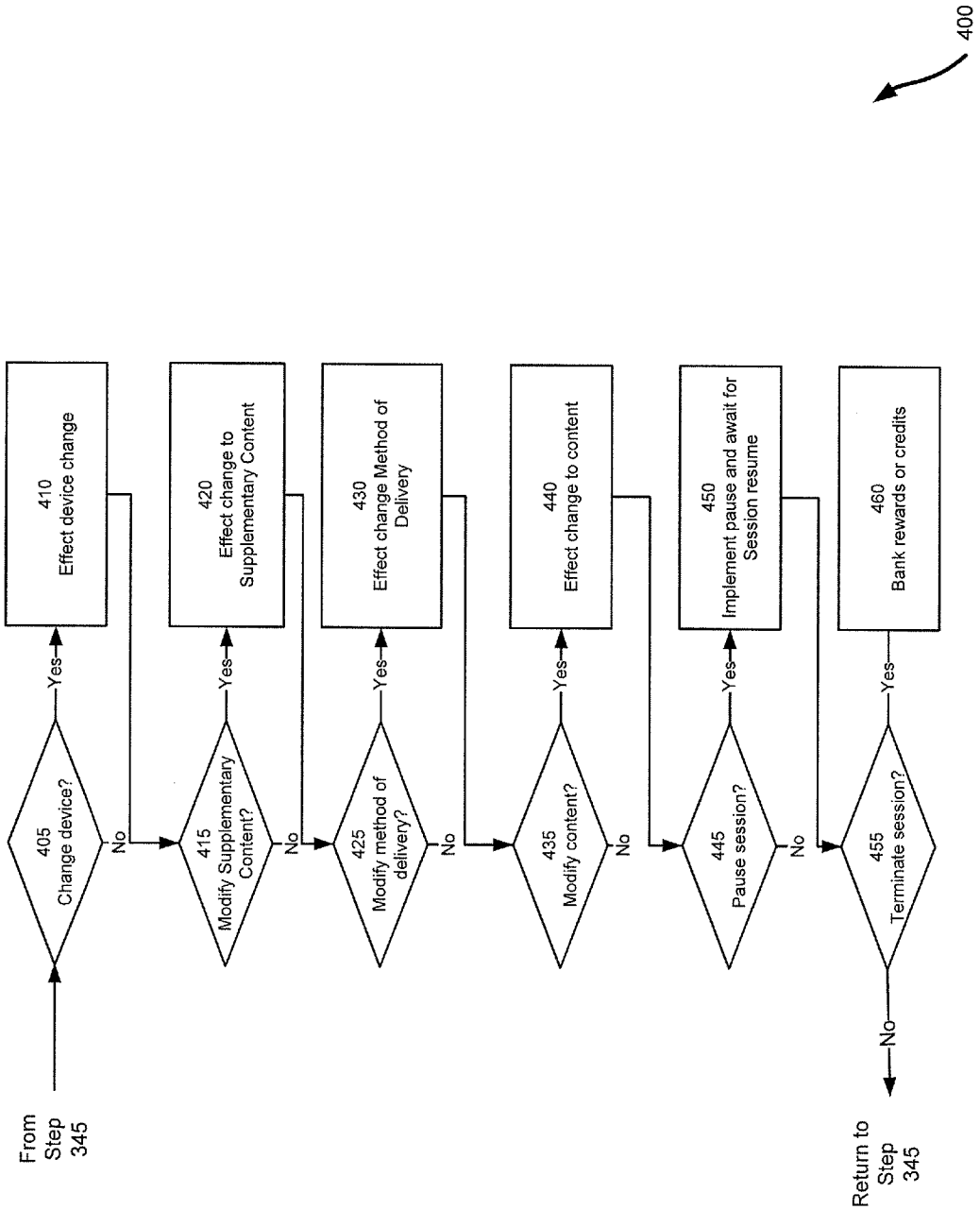
FIG. 4 shows a flowchart depicting another method for providing mobile services.

Referring now to FIG. 4, a method for providing mobile services in accordance with another embodiment is represented in flow-chart and indicated generally at 400. Method 400 can be, though need not be, used subsequent to performance of step 345. Like method 300, method 400 can also be performed on system 50 or variants thereof. Also, it should be understood that method 400 can also be varied, itself.

Method 400 provides a number of decisions and modifications that can be made, typically by server 66 and/or PED 54, during the delivery of content and supplementary content. In variations of method 400, not all of the actual steps shown therein need be performed, and like all methods discussed herein, the steps of method 400 need not be performed in the exact order shown.

Beginning at step 405, a determination is made as to whether the device has been changed. For example, subscriber S can elect during performance of step 345 to terminate delivery of content on PED 54 and elect to have that content continued to be delivered on another device. For example, where PED 54 is configured to operate on a global access network ("GAN"), whereby PED 54 can roam from wide area networks to local area networks. In this example, where subscriber S initiates step 345 via over a wide area network but then roams to a local area network within the home of subscriber S, subscriber S can elect to terminate receiving the content on PED 54 and redirect the remainder of the presentation of the content on the desktop computer or other device, such as a television, within the home of subscriber S. Thus, step 410 is configured to manage the appropriate handoff between PED 54 and the other device that will be used. It is contemplated that step 405 and step 410 can be implemented for any change from PED 54 to any other device capable of performing substantially the same functions needed to perform step 345.

Step 415 is a determination for modifying the supplementary content. For example, in the map of Los Angeles scenario provided earlier, the supplementary content, the form of a weather report for Los Angeles, can be periodically updated as updates to weather reports are made. Likewise, in the scenario whereby subscriber S is viewing a movie, then the supplementary content in the form of advertising can be changed according a change in the context of subscriber S including the subscribers location or roaming state. For example, where subscriber S initiates method 300 in the USA, but then drives over the border into Canada, then the advertising presented as supplementary content can be changed to Canadian-centric advertising from US-centric advertising.

Step 425 is a determination to modify the method of delivery. Step 430 can thus be effected when subscriber S has changed devices at step 405, so that the method of delivery of either the supplementary or the requested content can be modified to suit the particular device being used. Likewise, step 430 can be effected when PED 54 roams such that the quality or the nature of communication link 58 changes, thereby affecting the amount of bandwidth available thereover, and thereby influencing the overall quality of the content being delivered to PED 54.

Set 435 is a determination as to whether to modify the content originally determined at step 305, with step 440 dedicated to actually changing that content. Such a modification to the content could be based on, for example, subscriber S "switching channels" to another video stream offered on server 86-1. As another example, such modification to the content could be based on algorithmic means based on subscriber's preferences and upon the attainment of various criteria including time and contextual attributes such as location. Other examples for situations where it can be determined to modify content will now occur to those of skill in the art.

Step 445 is a determination as to whether to pause an overall subscriber session. Where the content being delivered is a movie, then such a determination can be made based on a request of the subscriber to "pause" the movie.

Step 455 is a determination as to whether to terminate the session. The termination could be made because the subscriber elected to terminate the session, or the subscriber had paused the session beyond a predefined period of time, because delivery of the content was complete. Termination could occur due to a change in the delivery mechanism or context (e.g. subscriber location) such that the content or supplementary content can no longer be delivered. If the session is not terminated then method 400 can return to step 345. If the method is terminated, then step 460 can be used to bank rewards or credits. For example, a promotion, loyalty, or reward program consisting of points can be implemented whereby the subscriber S obtains reward points, or credits, for having received certain amounts of content and/or supplementary content.

While the foregoing describes certain exemplary embodiments, it should be understood that combinations, variations and subsets of those embodiments are contemplated. For example, it should be understood that while the embodiments herein relate to portable electronic devices, the embodiments can be modified to work with nomadic or fixed electronic devices.

What is claimed is:

1. A method in a server of delivering content to a portable electronic device comprising:
   determining that content is to be delivered to said portable electronic device;
   determining a subscription level for a subscriber of said portable electronic device;
   retrieving a subscriber profile associated with said portable electronic device;
   determining, based on said subscription level and said subscriber profile, whether to deliver supplementary content with said content, said determining being repeatable responsive to a change in device context, during delivery of said content to said portable electronic device, such that said determining is dynamically changeable according to one or more of time, location and presence; and, if delivery of said supplementary content is to be effected then:
      determining a method of delivery of said content based on said subscription level and said subscriber profile;
      determining a method of delivery of said supplementary content based on said subscription level and said subscriber profile;
      determining said supplementary content based on said subscription level and said subscriber profile; and
      delivering said content and said supplementary content.

2. The method of claim 1 wherein said content is a map and said supplementary content includes weather conditions for a location on said map.

3. The method of claim 1 wherein said subscription level includes an indication of whether said subscriber has elected to receive said supplementary content.

4. The method of claim 1 further comprising, where said subscription level does not indicate whether said subscriber has elected to receive said supplementary content, sending a query to said portable electronic device querying whether said subscriber wishes to receive said supplementary content.

5. The method of claim 1 wherein said subscription level includes an indication of whether said subscriber has elected to receive said supplementary content when said subscriber is roaming.

6. The method of claim 1 wherein said method of delivery of said content is based on one or more of: display characteristics of said portable electronic device; a location of said portable electronic device; available bandwidth of a physical link connecting a base station to said portable electronic device.

7. The method of claim 1 wherein said method of delivery of said supplementary content includes one or more of: a streaming video and a text banner.

8. The method of claim 1 further comprising, during said delivering, effecting a change from said portable electronic device to another electronic device such that said delivering continues on said another electronic device.

9. The method of claim 1 further comprising, during said delivering, effecting a change in said supplementary content.

10. The method of claim 1 further comprising, during said delivering, effecting a change in said content.

11. The method of claim 1 further comprising, temporarily pausing said delivering in response to a request from said portable electronic device.

12. The method of claim 1 further comprising, banking rewards or credits on a subscriber account associated with said subscriber corresponding to a level of supplementary content received by said subscriber.

13. The method of claim 1 where the determination of whether content is to be delivered to said portable device is invoked via a request from said portable electronic device.

14. The method of claim 1 wherein said content or supplementary content consists of different media including video-streams, music-streams, pictures, applications, files, and text-messages.

15. The method of claim 1 wherein said subscription level can include an indication of whether said subscriber is to receive said supplementary content.

16. The method of claim 15 wherein said indication of whether the subscriber is to receive said supplementary content is set by a subscriber, the network operator, or via algorithmic means.

17. The method of claim 15 wherein said indication of whether said subscriber has elected to receive said supplementary content per a given set of contextual attributes.

18. The method of claim 17 wherein said set of contextual attributes includes one or more of the type of the portable electronic device being utilized by the subscriber, the location of the subscriber, whether the subscriber is roaming, proximity of said subscriber to vendors of services or products, or attributes of available communications links to the subscriber's portable electronic device.

19. A carrier administrator server comprising:
an interface interconnecting a portable electronic device, a content server and at least one additional content server;
a processing unit connected to said interface configured for receiving a request to deliver content to said portable electronic device;
said processing unit further configured to determine a subscription level associated with said portable electronic device;
said processing unit further configured to retrieve a subscriber profile associated with said portable electronic device;
said processing unit further configured to determine, based on said subscription level and said subscriber profile, whether to deliver supplementary content with said content, said determination being repeatable responsive to a change in device context, during delivery of said content to said portable electronic device, such that said determining is dynamically changeable according to one or more of time, location and presence; and, if delivery of said supplementary content is to be effected then:
determining a method of delivery of said content based on said subscription level and said subscriber profile;
determining a method of delivery of said supplementary content based on said subscription level and said subscriber profile;
determining said supplementary content based on said subscription level and said subscriber profile; and
delivering said content and said supplementary content.

20. The carrier administrator server of claim 19 wherein said content is a map and said supplementary content includes weather conditions for a location on said map.

21. The carrier administrator server of claim 19 wherein said subscription level includes an indication of whether said subscriber has elected to receive said supplementary content.

22. The carrier administrator server of claim 19 further comprising, where said subscription level does not indicate whether said subscriber has elected to receive said supplementary content, said processing unit being configured to send a query to said portable electronic device querying whether said subscriber wishes to receive said supplementary content.

23. The carrier administrator server of claim 19 wherein said subscription level includes an indication of whether said subscriber has elected to receive said supplementary content when said subscriber is roaming.

24. The carrier administrator server of claim 19 wherein said method of delivery of said content is based on one or more of: display characteristics of said portable electronic device; a location of said portable electronic device; available bandwidth of a physical link connecting a base station to said portable electronic device.

25. The carrier administrator server of claim 19 wherein said method of delivery of said supplementary content includes one or more of: a streaming video, text banner, music-streams, pictures, banners, applications, files, and text-messages.

26. The carrier administrator server of claim 19 wherein said processing unit is further configured to, during said delivering, effect a change from said portable electronic device to another electronic device such that said delivering continues on said another electronic device; said change based on one or more of: a location of the portable electronic device, whether the portable electronic device is roaming, or the attributes of available communications links to the subscriber's portable electronic device.

27. The carrier administrator server of claim 19 wherein said processing unit is further configured to, during said delivering, effect a change in said supplementary content.

28. The carrier administrator server of claim 19 wherein said processing unit is further configured to, during said delivering, effect a change in said content.

29. The carrier administrator server of claim 19 wherein said processing unit is further configured to, during said delivering, temporarily pause said delivering in response to one or more of a request from said portable electronic device, including the nature of the portable electronic device being utilized by the subscriber, the location of the subscriber, whether the subscriber is roaming, or the attributes of available communications links to the subscriber's portable electronic device.

* * * * *